United States Patent [19]
Baker et al.

[11] Patent Number: 4,569,165
[45] Date of Patent: Feb. 11, 1986

[54] STRUCTURAL CONNECTIONS

[75] Inventors: Stephen Baker, Godalming; Leonard C. Hollaway, Lightwater; Christopher E. Terrell, Wimbledon, all of England

[73] Assignee: University of Surrey, Guildford, England

[21] Appl. No.: 563,631

[22] Filed: Dec. 20, 1983

[30] Foreign Application Priority Data

Dec. 21, 1982 [GB] United Kingdom ............... 8236252

[51] Int. Cl.$^4$ .................. E04B 1/32; E04B 7/08; F16B 7/00; B32B 31/00
[52] U.S. Cl. ........................................ 52/81; 52/309.1; 52/648; 403/171; 403/176; 156/294; 156/295; 156/91
[58] Field of Search ............... 52/81, 309.1, 646, 648; 403/170, 171, 172, 176; 156/91, 92, 158, 293, 294, 303.1, 304.2, 295

[56] References Cited

U.S. PATENT DOCUMENTS

| 3,146,142 | 8/1964 | Maly | 156/91 |
| 4,049,480 | 9/1977 | Kutschke | 156/304.2 X |
| 4,285,609 | 8/1981 | Runyon | 403/172 |

FOREIGN PATENT DOCUMENTS

| 3010685 | 10/1981 | Fed. Rep. of Germany . |
| 1175789 | 4/1959 | France . |
| WO79/00176 | 4/1979 | PCT Int'l Appl. . |
| 392170 | 9/1965 | Switzerland . |
| 1128601 | 9/1968 | United Kingdom . |
| 2036846 | 7/1980 | United Kingdom . |

*Primary Examiner*—Michael R. Lusignan
*Attorney, Agent, or Firm*—Leydig, Voit & Mayer, Ltd.

[57] ABSTRACT

A structural connection between a tubular thermosetting plastics member and a thermoplastics end cap is described. An end of the tubular member is inserted into an annular, axially extending gap in the thermoplastics end cap. The inner and outer wall surfaces of the gap are threaded. Adhesive fills the space between the end of the tubular member and the threaded surfaces of the gap.

12 Claims, 6 Drawing Figures

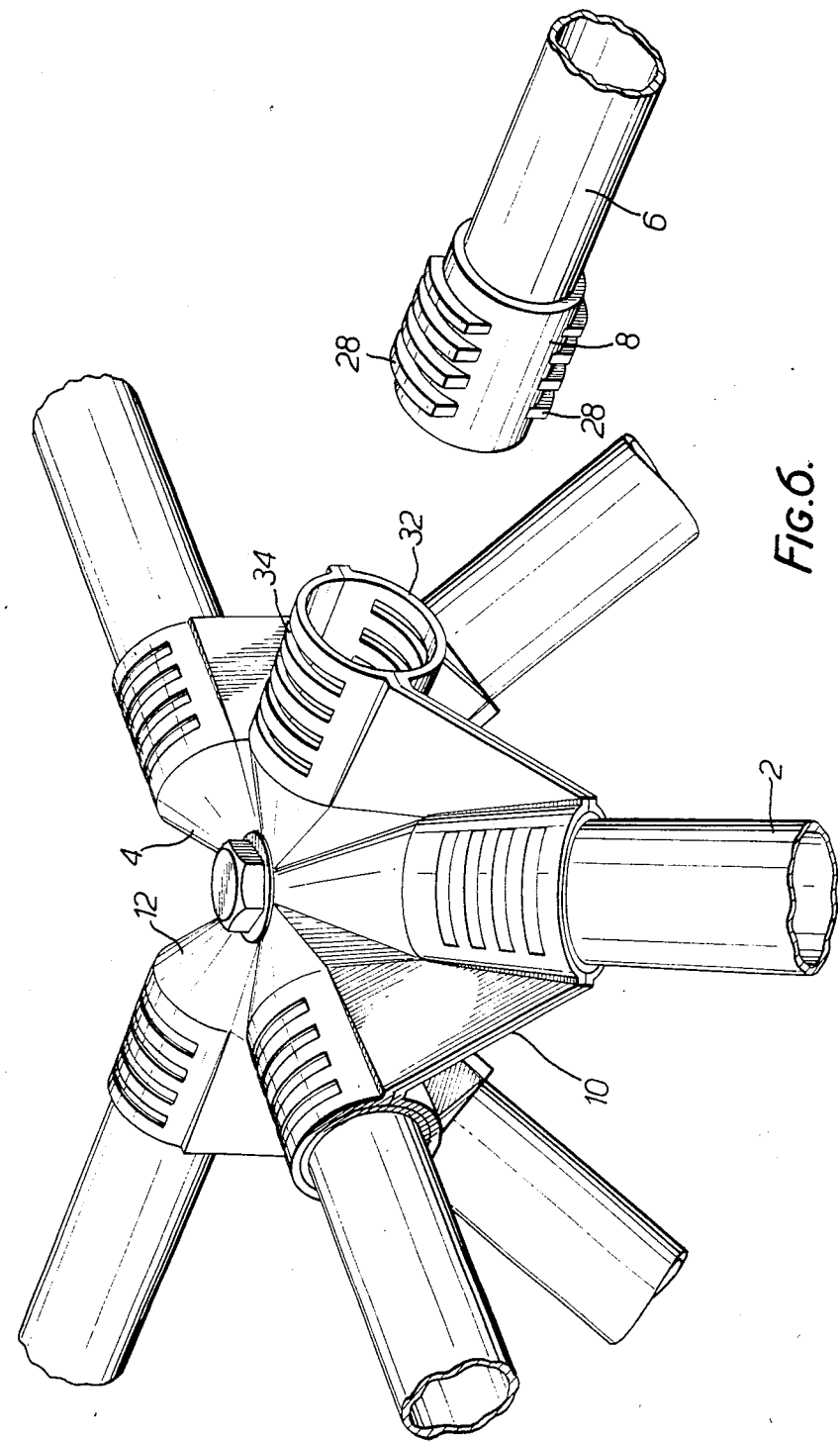

STRUCTURAL CONNECTIONS

BACKGROUND OF THE INVENTION

1. Technical Field

The present invention relates to structural connections between thermosetting polymer and thermoplastic polymer or aluminium elements, and methods of forming such structural connections.

The method of the invention is particularly, but not exclusively, suitable for connecting end caps to polymer tubes to form component members for the construction of structures.

2. Prior Art

Spaceframes are usually built up from simple, prefabricated units (i.e. members and nodes), which are often of standard size and shape. Such units are mass produced in the factory and can easily and rapidly be assembled on site by semi-skilled labour. The small size of the components greatly simplifies handling, transportation and erection.

Spaceframe roofs are extremely rigid and stiff, and have an exceptional ability to resist large, concentrated or asymmetrical loading. It has been shown that, even when badly damaged, double layer grids never collapse rapidly; this is of particular importance in the case of fire.

Load-bearing spaceframes have conventionally been constructed of steel or aluminium component members and nodes. However, in order to provide a less expensive spaceframe structure particularly suitable for smaller roofing spans of, for example, less than 10 to 15 meters, it would be desirable to use polymer materials.

If the manufacturing costs of a lightweight plastics spaceframe are to be low, the structure must make use of injection moulded nodes. Polymers suitable for such injection mouldings would normally be of the thermoplastics variety while those suitable for the tubular members of the spaceframe would be of the thermosetting variety (for example, polyester). There are considerable differences between these two types; for example, thermoplastics are usually weaker and are more difficult to chemically bond than thermosetting polymers.

A suitable material for the tubular members would be pultruded G.R.P. (glass reinforced polyester). Tubes of this material have excellent strength and stiffness properties, but it has always been exceptionally difficult to transfer loads from the material. If the tubes are drilled to receive bolted connections, the continuous glass fibres are broken and the material severely weakened; the bolts simply shear through the tubes.

It is not possible to weld the material, and the process of threading the tubes again merely breaks the load-carrying glass fibres. The only practical method of utilizing the full strength of the material is to transfer load by adhesive bonding. The main problem with the use of adhesives, however, is the control of the glue line thickness; this is critical if a good bond is to be achieved. If the glue line is too thick then the adhesive will shear through at a low load; if the glue line is too thin, then there is the risk that, in places, no adhesive exists at all. In addition it is generally considered by the construction industry that adhesives are not suitable outside the controlled conditions of factories.

SUMMARY OF THE INVENTION

The present invention accordingly provides a structural connection including two elements, made of a first polymer material and of a thermoplastics material or aluminium respectively, one element having wall portions which define a recess, the other element having an end portion having opposing surfaces, which end portion is accommodated in said recess so as to provide two pairs of cooperating surfaces defining a space therebetween, one surface of each said pair being a surface of said recess defining wall portion and the other said surface of each said pair being a said surface of said end portion, said thermoplastics or aluminium one of each said pair of co-operating surfaces defining grooves, and adhesive substantially filling said space between each said pair of co-operating surfaces which adhesive chemically bonds to the surface made of the first polymer material.

The invention also includes a method of forming a structural connection between an end of a cylindrical member and a closed-ended member having an internally threaded annular wall defining a recess having substantially the same diameter as the cylindrical member, including the steps of introducing adhesive into said recess and pushing said cylindrical member into the recess until it reaches the closed end, thereby forcing adhesive to run around the thread to substantially completely fill the space between the wall and the cylindrical member.

BRIEF DESCRIPTION OF THE DRAWINGS

FIG. 6 shows a perspective view of a connection of spaceframe members at a node of the spaceframe illustrated in FIGS. 4 and 5.

DESCRIPTION OF A PREFERRED EMBODIMENT

Figure 4:
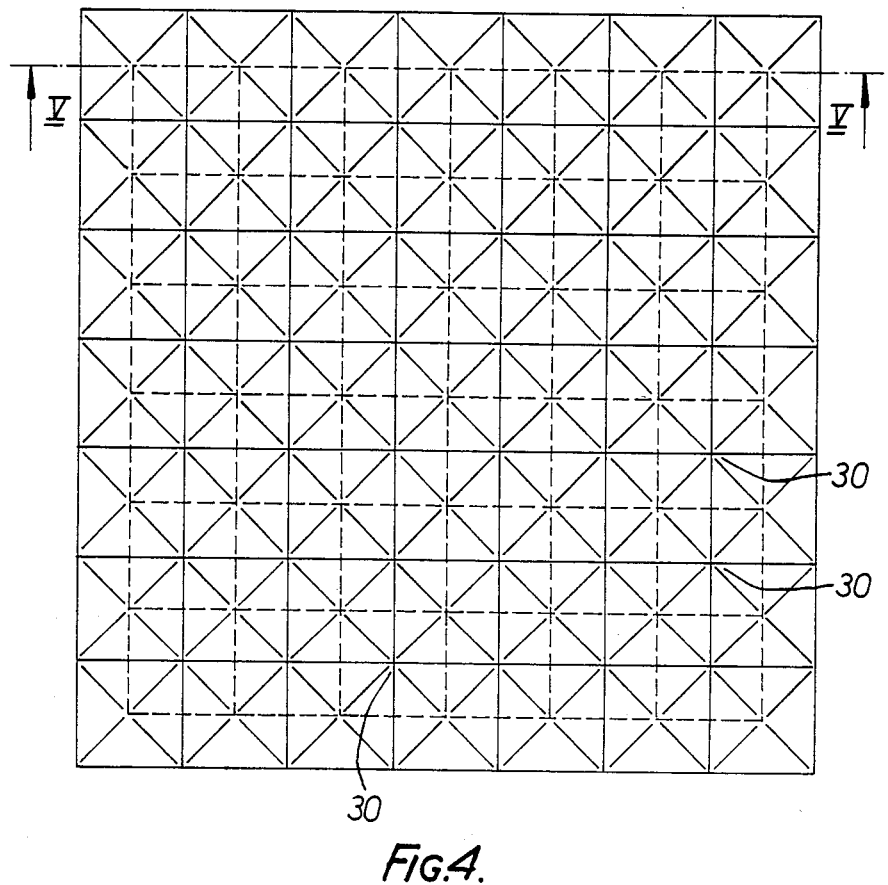
FIG. 4 shows a plan view of a double-layer grid spaceframe.
Figure 5:
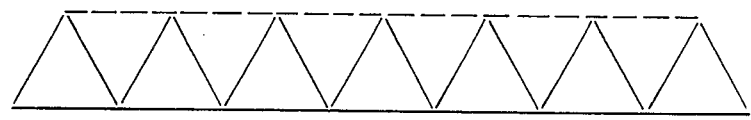
FIG. 5 shows a section on the line V—V of FIG. 4.

A spaceframe as illustrated in FIGS. 4 to 6 is made up of a plurality of tubular members 2 and nodes 4.

Each tubular member 2 comprises a hollow tube 6 with an end cap 8 joined to the tube 6 at each end. The end caps 8 are designed to co-operate with connecting plates 10 and 12 at the nodes 4, as illustrated in FIG. 6.

Figure 1:
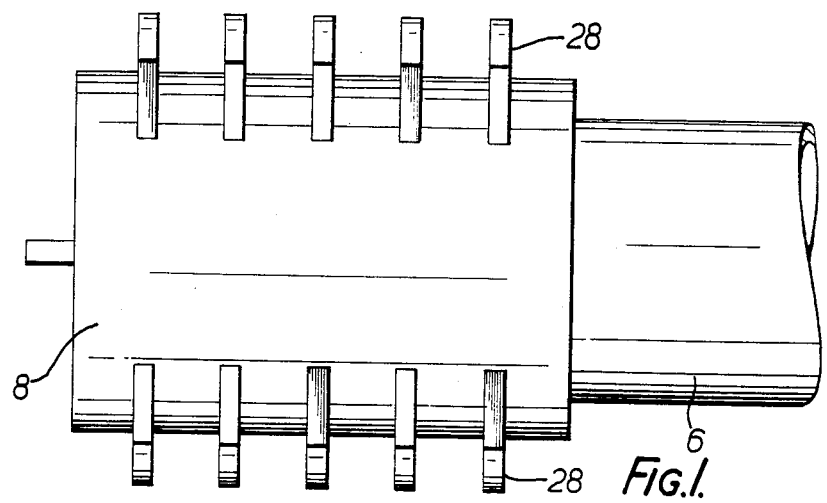
FIG. 1 is a side view of an end of a tubular member for use in spaceframe construction.

The method of construction of a tubular member 2 will now be described in more detail with reference to FIGS. 1 to 3 of the drawings. The tube for each member consists of a length (e.g. 0.5 meters to 1.0 meters), of, for example, 25 mm diameter pultruded G.R.P. tube. End caps 8 are mounted to each end of this tube and are designed to transfer load from the tube to the nodes. The end caps 8 are made from injection moulded fibre-filled thermoplastics polymer material. A suitable material is glass fibre-filled Nylon 66. It will be appreciated that other thermoplastics materials with or without fibre reinforcement are suitable for this purpose. It would also be possible to use aluminium end caps.

Figure 2:
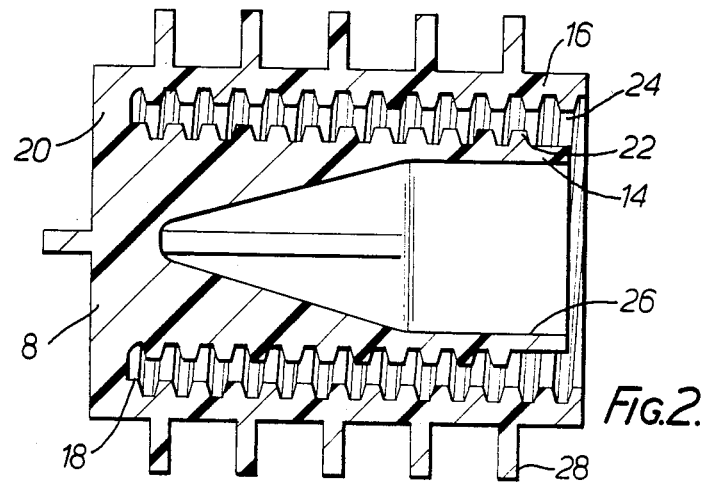
FIG. 2 shows a section through an end cap of the member of FIG. 1.
Figure 3:
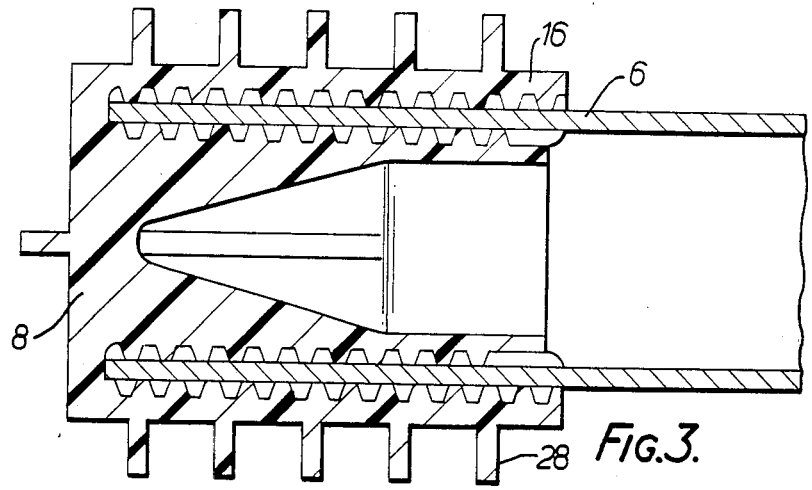
FIG. 3 shows a section through the spaceframe member of FIG. 1.

The end cap 8 which is illustrated in more detail in FIGS. 2 and 3 has inner and outer annular walls 14, 16 which define an axially extending annular gap 18 which is closed off by an end 20 of the end cap. Threads 22, 24 are formed in the facing surfaces of the inner and outer walls 14, 16. It is also possible to provide threads in one only of the inner or outer walls. These threads 22, 24 are helical and substantially of the same pitch in order that the end cap can readily be moulded. The central portion 26 of the end cap is hollow. There are five pairs of tapered nibs 28 on the external face of the end cap. These nibs 28 co-operate with slots in the connecting plates 10, 12 of the node as will be described in more detail later.

The end cap is preferably formed by injection moulding in one-piece.

In order to connect the tubes to the end cap, a measured quantity of epoxy resin adhesive, for example Ciba Geigy AY 105/HY 956 (or similar), is injected into the gap 18 and the end portion of the tube 6 is pushed into the gap until it reaches the end 20. This forces the adhesive to run around the threads 22, 24 on either side of the tube where it sets. The presence of the threads controls the glue line thickness. Moreover, as the adhesive must run round the threads before it can reach the outside of the end cap, the escape of adhesive provides an indication of the fact that adhesive must have run around the entire threads 22, 24. The adhesive forms a mechanical bond with the end cap because of the grooved surface provided by the threads 22, 24. It is necessary that the adhesive should form a mechanical bond with the end cap as only a poor chemical bond is formed between the adhesive and the thermoplastics of the end cap. Preferably, the end of the tube 6 is lightly roughened before it is inserted into the end cap 8. This ensures the very good chemical bond to the glass fibres within the tube.

In order to increase the loading on a spaceframe structure, the most highly stressed tubular members may have tubes 6 which are made of carbon fibre reinforced polymer.

Whilst hollow tubular members 6 have been envisaged these members could also be solid in which case the end cap 8 would not have the externally threaded inner wall 14. Where the end caps 8 are aluminium, this type of construction with no inner wall 14 is also preferred.

FIGS. 4 and 5 show a typical double-layer grid spaceframe construction with "square-on-square" member configuration. The construction is made up of a number of tubular members as described connected at nodes 30 by connectors which are not shown in FIGS. 4 and 5 but one of which is illustrated in FIG. 6. Each node 30 which is not at the edge of the spaceframe connects eight tubular members. Four of these tubular members extend at right angles to one another in a horizontal plane, and the remaining four are either downwardly or upwardly inclined at an angle of, for example, 45°. The same node can therefore be employed at all points in the body of the spaceframe, whether or not these are in the top or bottom layer. Such a spaceframe is suitable for use as a suspended ceiling or as an exhibition stand roof. It will be appreciated, also, that there are a great number of other possible applications.

The node illustrated in detail in FIG. 6 comprises co-operable top and bottom connecting plates 10, 12. The connecting plates are injection moulded from glass fibre-filled thermoplastics material, for example Nylon 66 for compatibility with the end caps. Each connecting plate has an oriented recess 32 for receiving half of the end cap 8 of each of the tubular members to be connected. Each of the recesses 32 is provided with five tapered slots into which the nibs 28 tightly fit. In this way, the eight tubular members are retained in one of the connecting plates during assembly of the node. Assembly is completed by positioning the other connecting plate over the tubular members so that the slots 34 in the recesses 32 of that plate engage the other nibs 28 on the opposite side of the end caps of the connecting members. The top and bottom connecting plates are secured together by means of, for example, a 10 mm steel nut and bolt. The thickness of the connecting plates will vary to take account of the anticipated stress distribution—the plates will be at their thickest (probably 5 mm) around the slots 34 and the central bolt holes where the greatest stress concentrations will occur.

It will be appreciated that the method of structurally connecting a thermoplastics polymer or aluminium element to a thermosetting polymer element which has been described above in relation to the attachment of a thermoplastics end cap 8 to a thermosetting tubular member 6, has possible wider applications.

In particular it is envisaged that elements of other shapes may be connected. For example, a laminar member may be inserted into a gap in a member to which it is to be connected. In this case each surface of the thermoplastics or aluminium member which co-operates with a surface of the laminar member in the gap will be grooved. In this way adhesive in the gap will form a mechanical bond with the thermoplastics member due to the presence of the grooves in that member's surface.

We claim:

1. A structural connection including
   two elements, made of a first polymer material and of a thermoplastics material or aluminium respectively, one element having wall portions which define a recess, the other element having an end portion having opposing surfaces, which end portion is accommodated in said recess so as to provide two pairs of cooperating surfaces defining a space therebetween, one surface of each said pair being a surface of said recess defining wall portion and the other said surface of each said pair being a said surface of said end portion, said thermoplastics or aluminium one of each said pair of co-operating surfaces defining grooves, and
   adhesive substantially filling said space between each said pair of co-operating surfaces which adhesive chemically bonds to the surface made of the first polymer material.

2. A structural connection wherein the first polymer is a thermosetting polymer.

3. A structural connection according to claim 1, wherein one of said elements is a tube and said recess is in the form of an axially-extending annular recess in the other element.

4. A structural connection according to claim 3, wherein at least one said grooved surface is threaded and is one of said wall surfaces defining said recess.

5. A structural connection according to claim 4, wherein the threads are helical and, where both surfaces are threaded, the threads are of substantially the same pitch.

6. A structural connection according to claim 4, wherein said tube is a fibre reinforced thermosetting polymer tube.

7. A structural connection according to claim 6, wherein said end portion of the tube is roughened to enable the adhesive to form a chemical bond with fibres in the material thereof.

8. A structural connection according to claim 1, wherein the thermoplastics element is a thermoplastics injection moulding.

9. A construction member for use in assembling a spaceframe comprising a hollow tubular member having two ends, and a pair of end caps secured to each said end of said tubular member by means of a structural connection as claimed in claim 1.

10. A construction member according to claim 9, wherein each of the end caps is provided with a plurality of laterally extending nibs.

11. A spaceframe constructed from a plurality of members according to claim 10, said members being connected at nodes of the spaceframe by means of cooperating top and bottom connecting plates which engage said nibs and clamp the end caps of the members in a desired position relative to one another.

12. A method of forming a structural connection between an end of a cylindrical member and a closed-ended member having an internally threaded annular wall defining a recess having substantially the same diameter as the cylindrical member, including the steps of introducing adhesive into said recess and pushing said cylindrical member into the recess until it reaches the closed end, thereby forcing adhesive to run around the thread to substantially completely fill the space between the wall and the cylindrical member.

* * * * *